United States Patent
Pisek (10) Patent No.: US 8,051,272 B2
(45) Date of Patent: Nov. 1, 2011

(54) METHOD AND SYSTEM FOR GENERATING ADDRESSES FOR A PROCESSOR

(75) Inventor: Eran Pisek, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 870 days.

(21) Appl. No.: 11/521,661

(22) Filed: Sep. 15, 2006

(65) Prior Publication Data

US 2007/0266222 A1  Nov. 15, 2007

Related U.S. Application Data (60) Provisional application No. 60/800,549, filed on May 15, 2006.

(51) Int. Cl.
*G06F 12/00* (2006.01)
(52) U.S. Cl. ........ 711/217; 711/215; 711/218; 711/219; 717/150
(58) Field of Classification Search .................. 711/200, 711/215, 217–219; 717/150
See application file for complete search history.

(56) References Cited

U.S. PATENT DOCUMENTS

| | | | | |
|---|---|---|---|---|
| 6,212,604 | B1* | 4/2001 | Tremblay | 711/125 |
| 6,463,518 | B1* | 10/2002 | Duboc | 711/220 |
| 6,948,160 | B2* | 9/2005 | Click et al. | 717/148 |
| 7,085,915 | B1* | 8/2006 | St. John et al. | 712/205 |
| 7,180,328 | B2* | 2/2007 | Gould et al. | 326/46 |
| 7,430,650 | B1* | 9/2008 | Ross | 711/213 |
| 7,665,079 | B1* | 2/2010 | Yasue et al. | 717/160 |

OTHER PUBLICATIONS

Pieter Op de Beeck, Francisco Barat, Murali Jayapala and Rudy Lauwereins, "CRISP: A Template for Reconfigurable Instruction Set Processors," Springer-Verlag Berlin Heidelberg 2001.*

* cited by examiner

*Primary Examiner* — Matthew Bradley
*Assistant Examiner* — Kalpit Parikh (57) ABSTRACT

A method for generating addresses for a processor is provided. The addresses are for use by an application that may be executed by the processor. The application comprises a plurality of instructions, and each instruction comprises at least one line. The method includes storing a plurality of predetermined addresses and, for each line of each instruction, generating at least one address for the processor based on the predetermined addresses.

32 Claims, 11 Drawing Sheets

| LOOP CONTROL | DATAW RST | DATAW INC | DATAR RST | DATAR INC |
|---|---|---|---|---|
| LOOP START | 1 | 0 | 1 | 0 |
| 0 | 0 | 1 | 0 | 1 |
| 0 | 0 | 1 | 0 | 1 |
| 0 | 1 | 0 | 1 | 0 |
| 0 | 0 | 1 | 0 | 1 |
| LOOP END | 0 | 1 | 0 | 1 |

| wa0 | wb0 | wc0 | wd0 |
|---|---|---|---|
| wa1 | wb1 | wc1 | wd1 |
| wa2 | wb2 | wc2 | wd2 |
| wa3 | wb3 | wc3 | wd3 |
| | | . . . | |
| waN - 2 | wbN - 2 | wcN - 2 | wdN - 2 |
| waN - 1 | wbN - 1 | wcN - 1 | wdN - 1 |

| ra0 | rb0 | rc0 | rd0 |
|---|---|---|---|
| ra1 | rb1 | rc1 | rd1 |
| ra2 | rb2 | rc2 | rd2 |
| ra3 | rb3 | rc3 | rd3 |
| | | . . . | |
| raN - 2 | rbN - 2 | rcN - 2 | rdN - 2 |
| raN - 1 | rbN - 1 | rcN - 1 | rdN - 1 |

| WRITE ADDRESS | READ ADDRESS |
|---|---|
| wx0 | rx0 |
| wx0 + 1 | rx0 + 1 |
| wx0 + 2 | rx0 + 2 |
| wx1 | rx1 |
| wx1 + 1 | rx1 + 1 |
| wx1 + 2 | rx1 + 2 |

METHOD AND SYSTEM FOR GENERATING ADDRESSES FOR A PROCESSOR

CROSS-REFERENCE TO RELATED APPLICATIONS AND CLAIM OF PRIORITY

The present application is related to U.S. Provisional Patent No. 60/800,549, filed May 15, 2006, titled "Pre-programmed Stack-based Address Generation Unit." U.S. Provisional Patent No. 60/800,549 is assigned to the assignee of the present application and is hereby incorporated by reference into the present disclosure as if fully set forth herein. The present application hereby claims priority under 35 U.S.C. §119(e) to U.S. Provisional Patent No. 60/800,549.

TECHNICAL FIELD OF THE INVENTION

The present invention relates generally to processors and, more specifically, to a method and system for generating addresses for a processor.

BACKGROUND OF THE INVENTION

Address generation units incorporated in processors, such as microprocessors, digital signal processors (DSPs) or the like, are typically designed to support and generate addresses for general purpose applications with different types and structures of complex data memory blocks. Conventional address generation units may employ one of several typical address generation methods.

For example, an address generation unit may use immediate addressing, which forces the instruction to include an immediate operand. This method results in the use of increased power and redundancy in the instruction. Another example often used is indirect addressing in which the data pointed to by a first address is the actual address to be used for the instruction. This method requires a complex hardware implementation that consumes a relatively large amount of power and die area. A third example that is used to generate addresses for multi-buses in some cases employs several pointers, one for each bus, generated based on a single indirect operand. However, this method uses a large instruction width and multiple calculations, resulting in a highly complex instruction.

Thus, none of these typical methods provides a power- and/or area-efficient method for generating addresses for a processor, especially for a processor that uses a multi-bus. Therefore, there is a need in the art for an improved method for generating addresses for processors.

SUMMARY OF THE INVENTION

A method for generating addresses for a processor is provided. The addresses are for use by an application that may be executed by the processor. The application comprises a plurality of instructions, and each instruction comprises at least one line. According to an advantageous embodiment of the present disclosure, the method includes storing a plurality of predetermined addresses and, for each line of each instruction, generating at least one address for the processor based on the predetermined addresses.

According to another embodiment of the present disclosure, a system for generating addresses for a processor is provided that includes an address generation unit (AGU) memory and an AGU. The AGU memory is operable to store a plurality of predetermined addresses. The AGU is operable, for each line of each instruction, to generate at least one address for the processor based on the predetermined addresses stored in the AGU memory.

According to yet another embodiment of the present disclosure, a system for generating addresses for a processor is provided that includes a program memory and a processor. The program memory includes an application and a compiler. The compiler is operable to calculate a plurality of predetermined addresses for the application. The processor is coupled to the program memory and includes an AGU memory and an AGU. The AGU memory is operable to store the predetermined addresses. The AGU is operable, for each line of each instruction, to generate at least one address for the processor based on the predetermined addresses stored in the AGU memory.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or" is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 12, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged processor.

Figure 1:
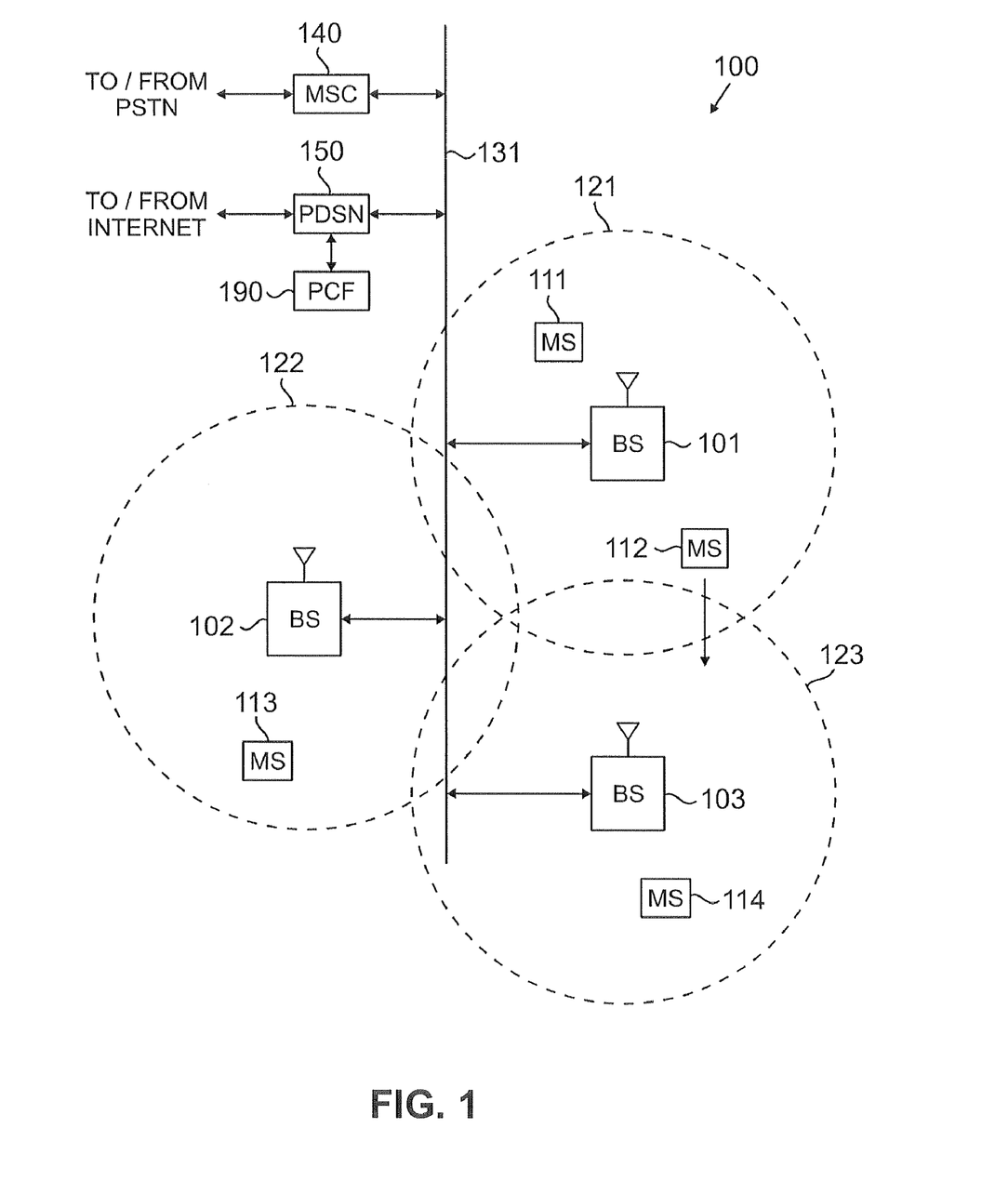
FIG. 1 illustrates a wireless network including base stations and mobile stations capable of generating addresses for a processor according to one embodiment of the disclosure.

FIG. 1 illustrates a wireless network 100 comprising base stations and mobile stations capable of generating addresses for processors according to one embodiment of the disclosure. Wireless network 100 comprises a plurality of cells (or cell sites) 121-123, each containing one of the base stations, BS 101, BS 102, or BS 103. Base stations 101-103 communicate with a plurality of mobile stations (MS) 111-114 over code division multiple access (CDMA) channels according to, for example, the IS-2000 standard (i.e., CDMA2000). In an advantageous embodiment of the present disclosure, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present disclosure is not limited to mobile devices. The present disclosure also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cells (or cell sites) 121-123 in which base stations 101-103 are located. It is noted that the terms "cells" and "cell sites" may be used interchangeably in common practice. For simplicity, the term "cell" will be used hereafter. The cells are shown approximately circular for the purposes of illustration and explanation only. It should be clearly understood that the cells may have other irregular shapes, depending on the cell configuration selected and variations in the radio environment associated with natural and man-made obstructions.

As is well known in the art, each of cells 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present disclosure is not limited to any particular cell configuration.

In one embodiment of the present disclosure, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell. This equipment may include air conditioning units, heating units, electrical supplies, telephone line interfaces and RF transmitters and RF receivers. For the purpose of simplicity and clarity in explaining the operation of the present disclosure, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

In accordance with the present disclosure, one or more of base stations 101-103 and one or more of mobile stations 111-114 may comprise processors with address generation units (AGUs) that are each operable to generate addresses for the corresponding processor based on pre-calculated addresses stored in an AGU memory and based on instructions that indicate whether a new address is to be loaded from the AGU memory or a current address is to be incremented. For a particular embodiment, a compiler calculates the addresses and changes of addresses, stores the addresses in the AGU memory, and sets bits in the program instructions to prompt the AGU to load new addresses or increment current addresses. Using this system, the instruction sets for the processor are significantly simplified and its complexity is significantly reduced. In addition, the complexity of the AGU is significantly reduced.

Communication line 131 may be any suitable connection means, including a T1 line, a T3 line, a fiber optic link, a network packet data backbone connection, or any other type of data connection. Alternatively, communication line 131 may be replaced by a wireless backhaul system, such as microwave transceivers. Communication line 131 links each vocoder in the BSC with switch elements in MSC 140. The connections on communication line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the mobile stations in a wireless network and external networks, such as the PSTN or Internet. MSC 140 is well known to those skilled in the art. In some embodiments, communication line 131 may be several different data links where each data link couples one of BS 101, BS 102, or BS 103 to MSC 140.

In exemplary wireless network 100, MS 111 is located in cell 121 and is in communication with BS 101. MS 112 is also located in cell 121 and is in communication with BS 101. MS 113 is located in cell 122 and is in communication with BS 102. MS 114 is located in cell 123 and is in communication with BS 103. MS 112 is also located close to the edge of cell 123 and is moving in the direction of cell site 123, as indicated by the direction arrow proximate MS 112. At some point, as MS 112 moves into cell site 123 and out of cell site 121, a hand-off will occur.

Figure 2:
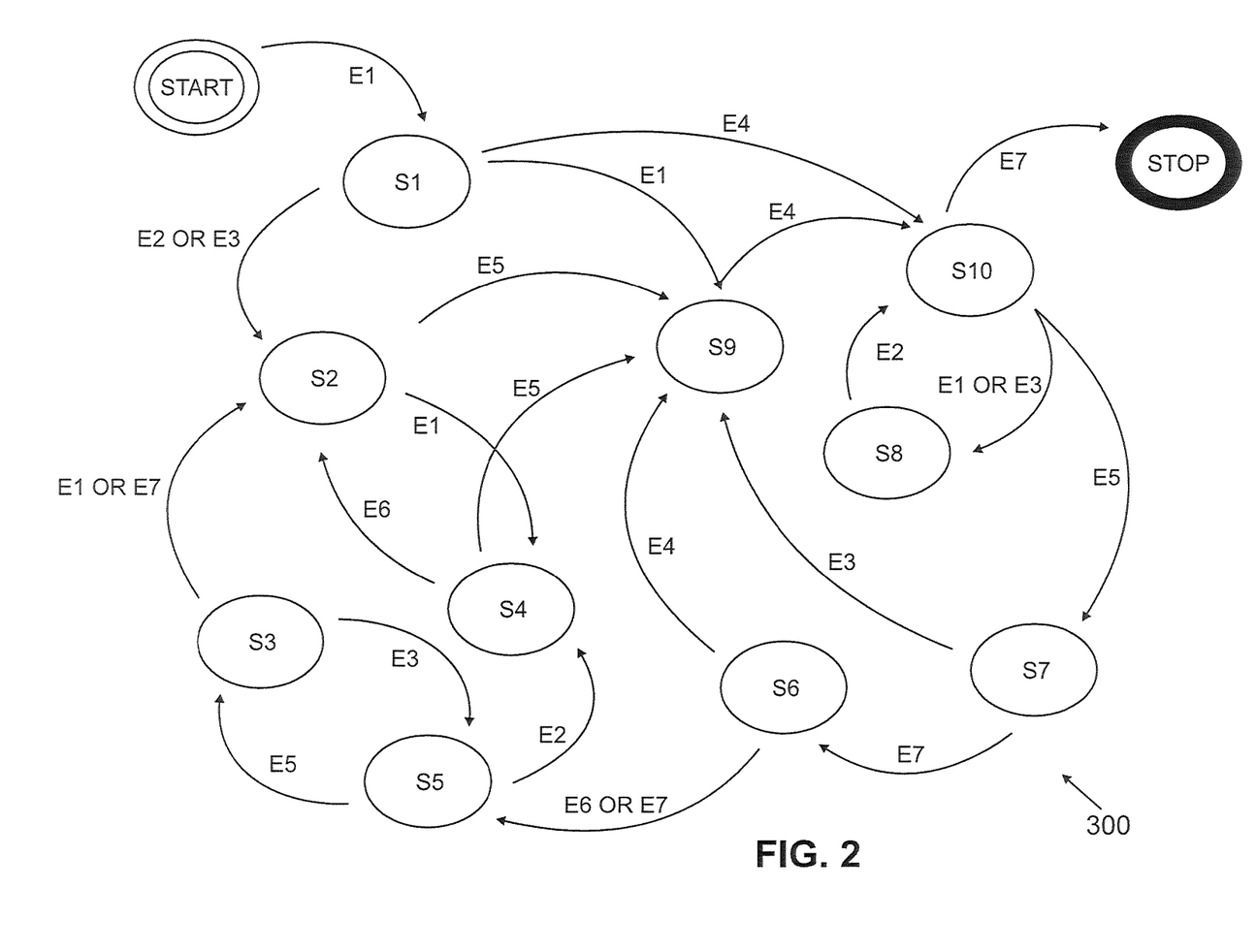
FIG. 2 is a bubble diagram for a finite state machine according to one embodiment of the disclosure.

FIG. 2 illustrates a bubble diagram 300 for a finite state machine table. Each of states S1-S10 is represented by a bubble and events E1-E7 cause transitions between states. These transitions are represented by the arrowed lines connecting the state bubbles. The arrowhead determines the direction of the transition.

Figure 3:
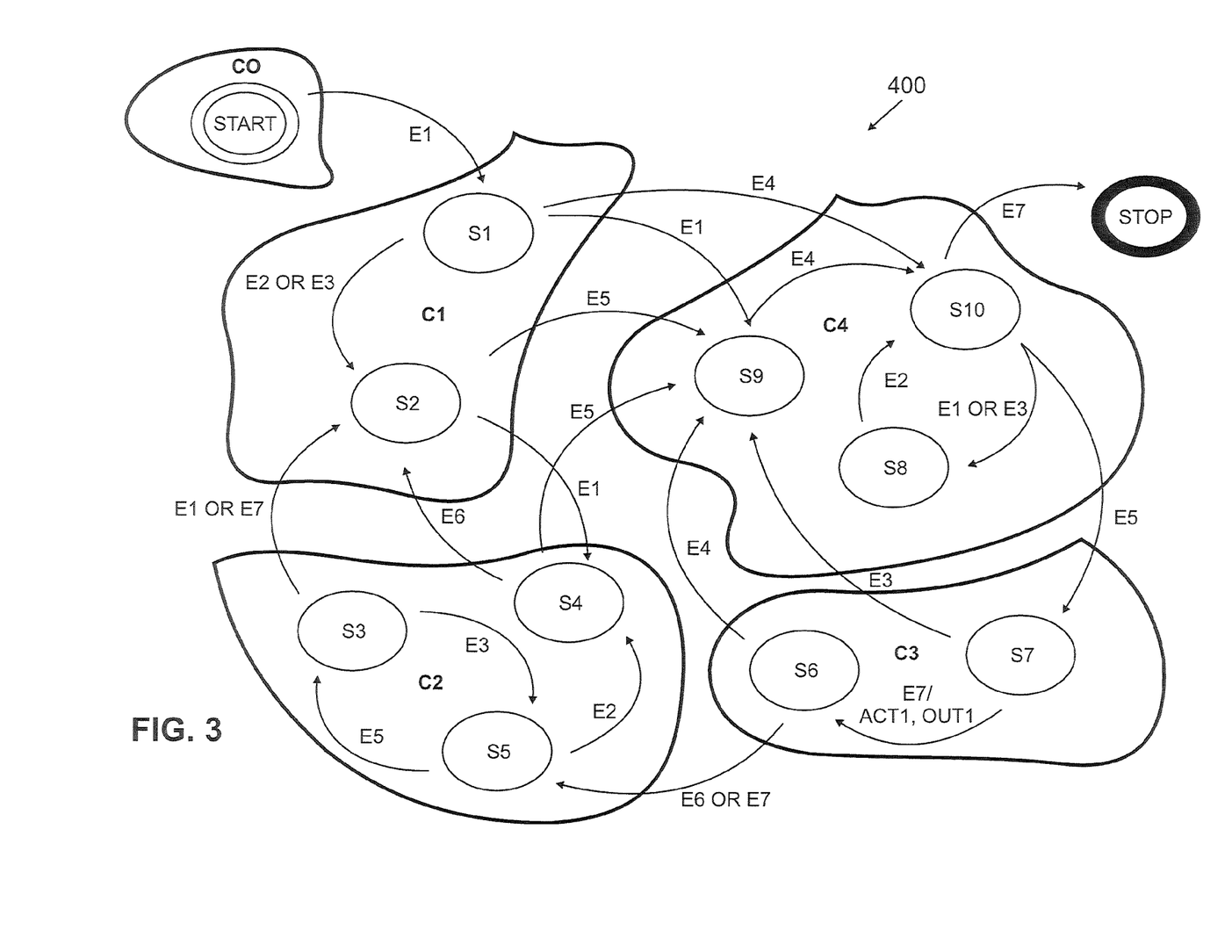
FIG. 3 is a bubble diagram showing context-based groupings of states in a finite state machine according to one embodiment of the disclosure.

It is noted that, in bubble diagram 300, it is possible to group states according to contexts of execution units. For the purposes of this disclosure, a context is a group of operations and/or instructions that are related to the same function. FIG. 3 illustrates bubble diagram 400, in which states of the finite state machine that are related to the same context are grouped together according to the principles of the present disclosure. The groupings of states form contexts C0, C1, C2, C3 and C4.

Each of the groupings of states in FIG. 3 may be used to create a context-based operation reconfigurable instruction set processor (CRISP) according to the principles of the present disclosure. Each of contexts C0-C4 comprises a minimum number of input events and a set of probable operations. Each context also has its own data path, which may comprise parallel execution units while the instruction set execution may be either in a VLIW, SIMD, microcode or other known implementation manner to increase the overall performance.

Figure 4:
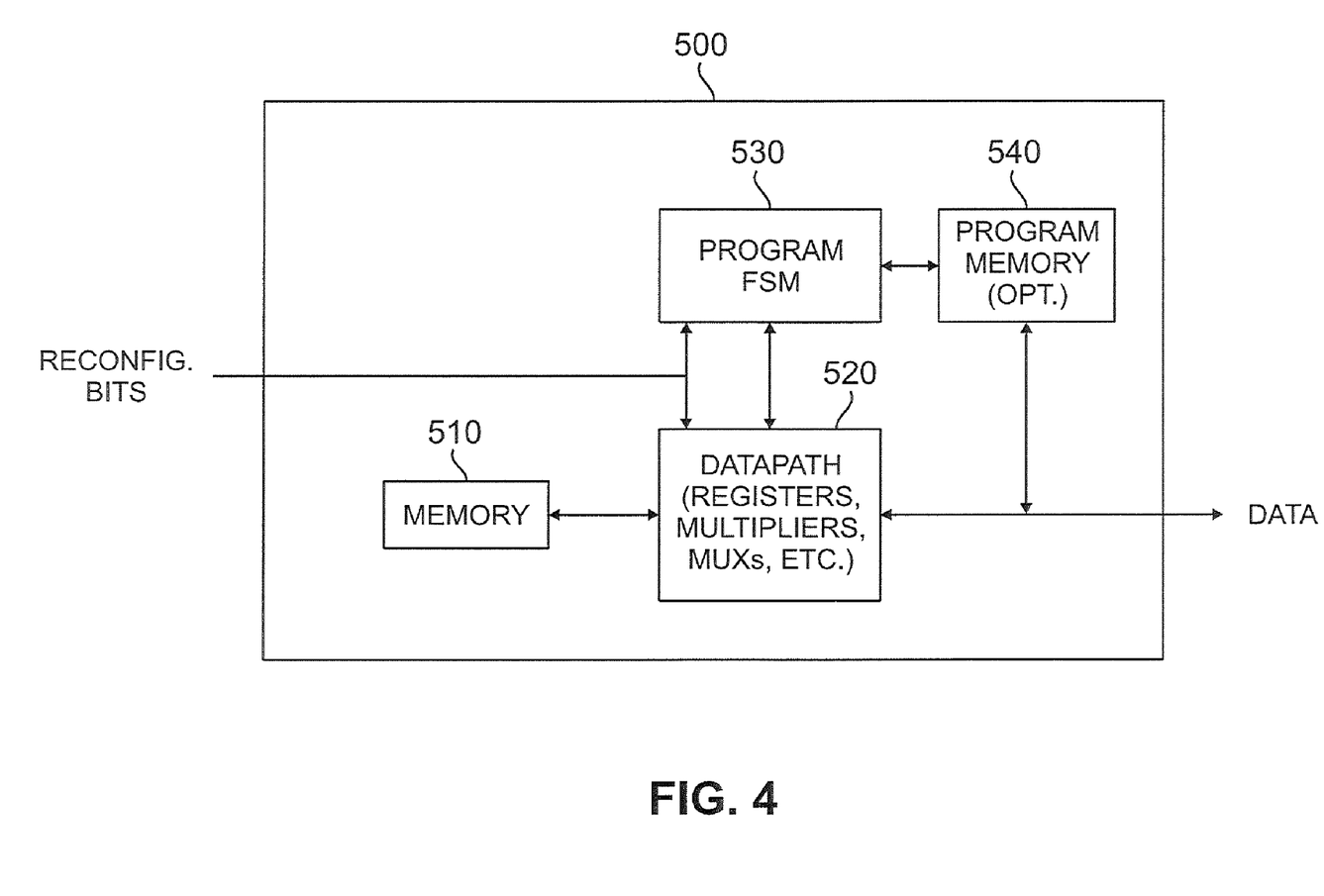
FIG. 4 is a block diagram of a context-based operation reconfigurable instruction set processor (CRISP) according to one embodiment of the disclosure.

FIG. 4 is a high-level block diagram of context-based operation reconfigurable instruction set processor (CRISP) 500, according to one embodiment of the present disclosure. CRISP 500 comprises memory 510, programmable data path circuitry 520, programmable finite state machine 530, and optional program memory 540. CRISP 500 is designed to implement only a subset of context-related instructions from FIG. 3 in an optimum manner. Each of the contexts C0-C4 in FIG. 3 may be implemented by a separate CRISP similar to CRISP 500. CRISP 500 defines the generic hardware block that usually consists of higher level hardware processor blocks. The principle advantage to CRISP 500 is that CRISP 500 breaks down the required application into two main domains, a control domain and a data path domain, and optimizes each domain separately. By implementing a data processor application, such as a mobile station handset (e.g., cell phone, wireless laptop), using CRISP 500, the flexibility vs. power problems that adversely affect conventional data processor applications may be at least partially overcome.

The control domain is implemented by programmable finite state machine 530, which may comprise a DSP, an MCU or another suitable device. Programmable FSM 530 is configured by reconfiguration bits received from an external controller (not shown). Programmable FSM 530 may execute a program stored in associated optional program memory 540. The program may be stored in program memory 540 via the DATA line from an external controller (not shown). Memory 510 is used to store application data used by data path circuitry 520.

Programmable data path circuitry 520 is divided into a set of building blocks that perform particular functions (e.g., registers, multiplexers, multipliers, and the like). Each of the building blocks is both reconfigurable and programmable to allow maximum flexibility. The criteria for dividing programmable data path circuitry 520 into functional blocks depends on the level of reconfigurability and programmability required for a particular application.

Since each of the contexts C0-C4 in FIG. 3 is implemented by a separate CRISP 500 that works independently of other CRISPs, an efficient power management scheme is provided that is able to shut down a CRISP when the CRISP is not required to execute. This assures that only the CRISPs that are needed at a given time are active, while other idle CRISPs do not consume any significant power.

A CRISP according to the principles of the present disclosure may be targeted to many applications, including, but not limited to, baseband applications in wireless devices and multimedia applications. In many applications, these contexts may be loosely-coupled independent contexts that may run concurrently with either minimum or no dependencies.

Figure 5:
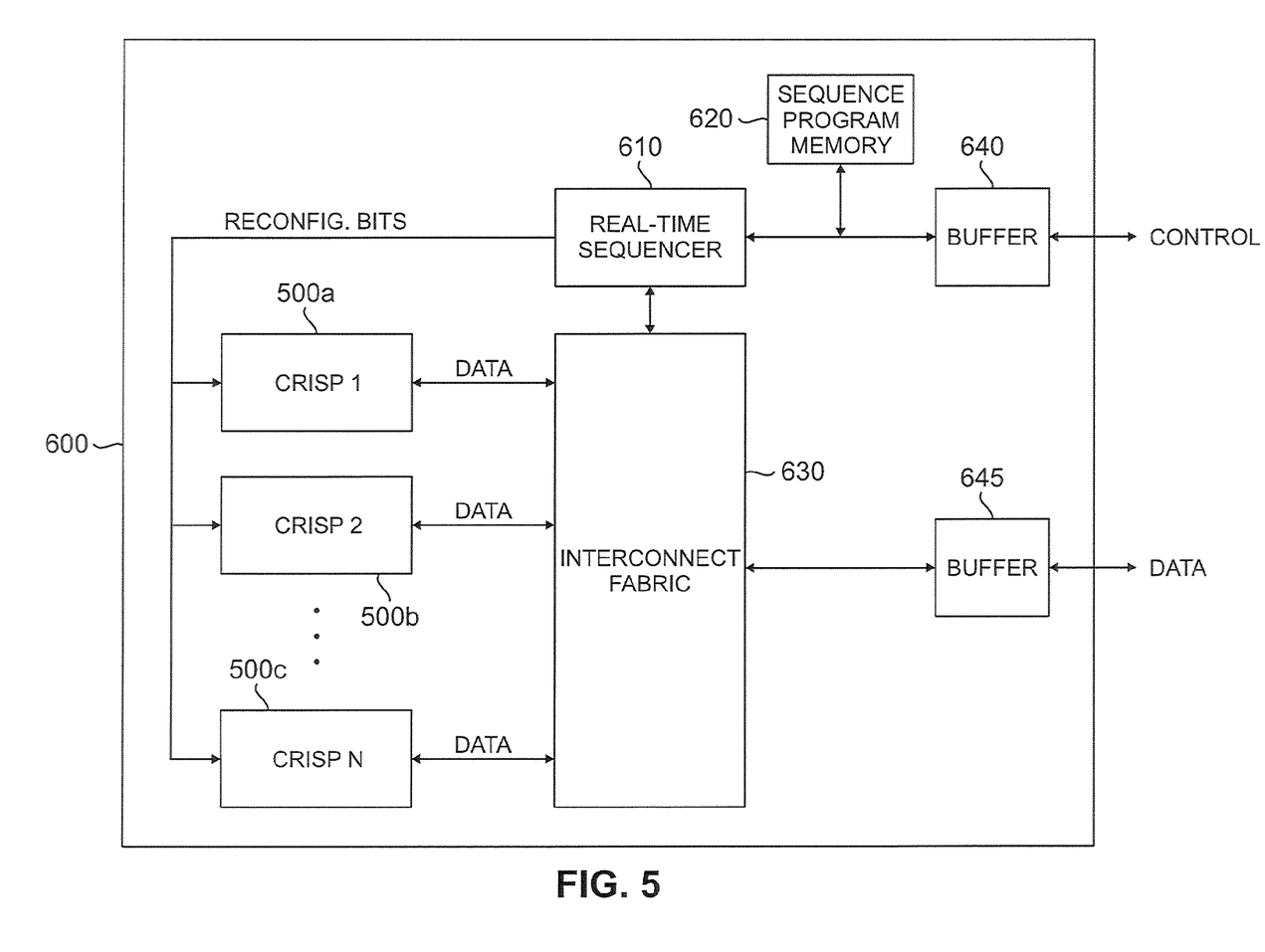
FIG. 5 is a block diagram of a reconfigurable processing system comprising a plurality of CRISPs according to one embodiment of the disclosure.

FIG. 5 is a high-level block diagram of reconfigurable processing system 600 according to one embodiment of the present disclosure. Reconfigurable processing system 600 comprises N context-based operation reconfigurable instruction set processors (CRISPs), including exemplary CRISPs 500a, 500b, and 500c, which are arbitrarily labeled CRISP 1, CRISP 2 and CRISP N. Reconfigurable processing system 600 further comprises real-time sequencer 610, sequence program memory 620, programmable interconnect fabric 630, and buffers 640 and 645.

Reconfiguration bits may be loaded into CRISPs 500a, 500b, and 500c from the CONTROL line via real-time sequencer 610 and buffer 640. A control program may also be loaded into sequence program memory 620 from the CONTROL line via buffer 640. Real-time sequencer 610 sequences the contexts to be executed by each one of CRISPs 500a-c by retrieving program instructions from program memory 620 and sending reconfiguration bits to CRISPs 500a-c. In one embodiment, real-time sequencer 610 may comprise a stack processor, which is suitable to operate as a real-time scheduler due to its low latency and simplicity.

Reconfigurable interconnect fabric 630 provides connectivity between each one of CRISPs 500a-c and an external DATA bus via bi-directional buffer 645. In one embodiment of the present disclosure, each one of CRISPs 500a-c may act as a master of reconfigurable interconnect fabric 630 and may initiate address access. The bus arbiter for reconfigurable interconnect fabric 630 may be internal to real-time sequencer 610.

In one embodiment, reconfigurable processing system 600 may be, for example, a cell phone or a similar wireless device or a data processor for use in a laptop computer. In a wireless device embodiment implemented according to software-defined radio (SDR) principles, each one of CRISPs 500a-c is responsible for executing a subset of context-related instructions that are associated with a particular reconfigurable function. For example, CRISP 500a may be configured to execute context-related instructions that process HSDPA baseband signals, CDMA baseband signals or OFDMA baseband signals. CRISP 500b may be configured to execute context-related instructions that act as a memory controller. CRISP 500c may be configured to execute context-related instructions that perform MPEG-4 processing for multimedia applications.

A CRISP according to the principles of the present disclosure provides a way of implementing reconfigurable hardware acceleration techniques and also provides reconfigurability and programmability with minimal sacrifice of power efficiency. Since the CRISPs are largely independent and may be run simultaneously, the performance advantage of parallelism is provided without incurring the full power penalty associated with running parallel operations. The loose coupling and independence of CRISPs allows them to be configured for different systems and functions that may be shut down separately.

Figure 6:
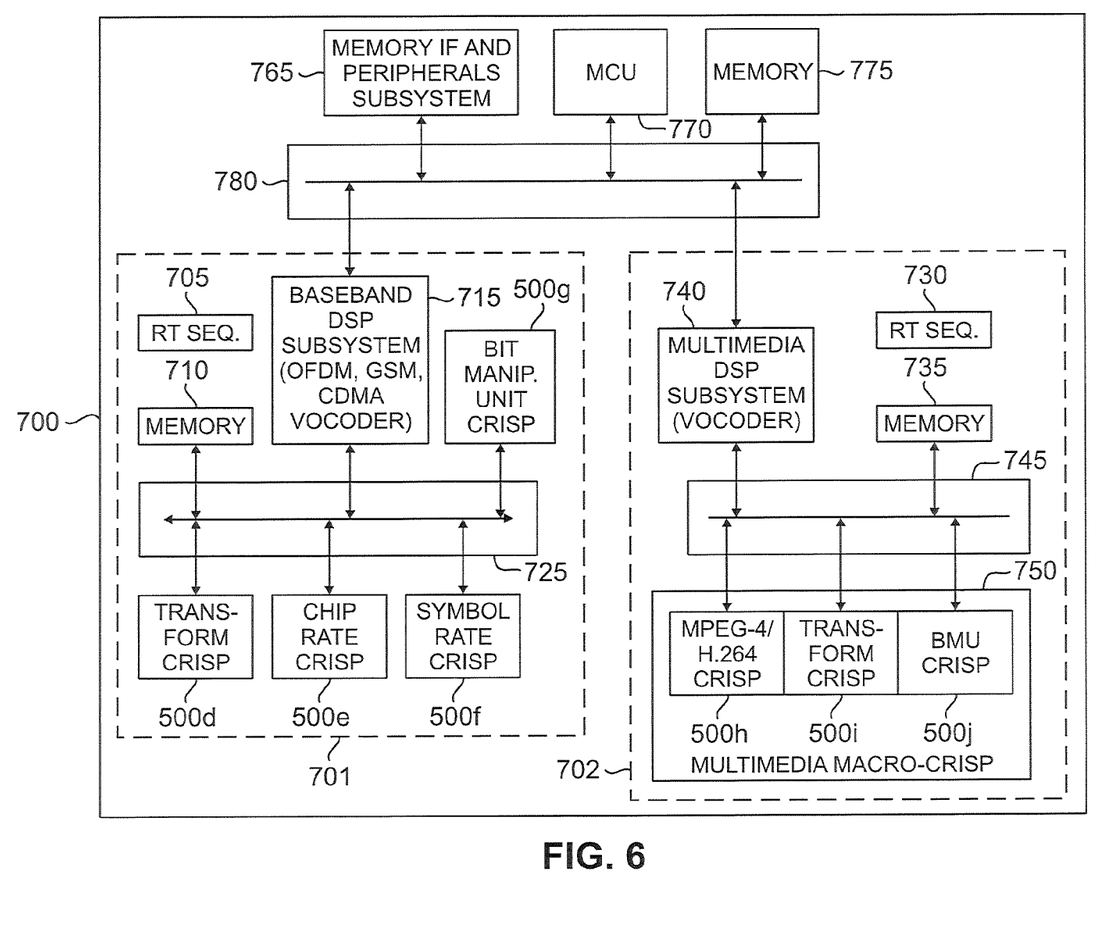
FIG. 6 is a block diagram of a multi-standard SDR system comprising a plurality of CRISPs according to one embodiment of the disclosure.

FIG. 6 is a high-level block diagram of multi-standard software-defined radio (SDR) system 700, which comprises a plurality of context-based operation reconfigurable instruction set processors (CRISPs), according to one embodiment of the present disclosure. SDR system 700 may comprise a wireless terminal (or mobile station) that accesses a wireless network, such as, for example, a GSM, CDMA or HSDPA cellular telephone, a PDA with WCDMA, HSDPA or IEEE-802.11x capabilities, or the like.

Multi-standard SDR system 700 comprises baseband subsystem 701, applications subsystem 702, memory interface (IF) and peripherals subsystem 765, main control unit (MCU) 770, memory 775, and interconnect 780. MCU 770 may comprise, for example, a conventional microcontroller or a microprocessor (e.g., x86, ARM, RISC, DSP, etc.). Memory IF and peripherals subsystem 765 may connect SDR system 700 to an external memory (not shown) and to external peripherals (not shown). Memory 775 stores data from other components in SDR system 700 and from external devices (not shown). For example, memory 775 may store a stream of incoming data samples received from an external antenna system and an RF down-converter associated with SDR system 700. Interconnect 780 provides data transfer between subsystems 701 and 702, memory IF and peripherals subsystem 765, MCU 770, and memory 775.

Baseband subsystem 701 comprises real-time (RT) sequencer 705, memory 710, baseband DSP subsystem 715, interconnect 725, and a plurality of special purpose context-based operation instruction set processors (CRISPs), including transform CRISP 500d, chip rate CRISP 500e, symbol rate CRISP 500f, and bit manipulation unit (BMU) CRISP 500g. By way of example, transform CRISP 500d may implement a Fast Fourier Transform (FFT) function, chip rate CRISP 500e may implement a correlation function for a CDMA or HSDPA signal, and symbol rate CRISP 500f may implement a Viterbi decoder function.

In such an embodiment, transform CRISP 500d may receive samples of an intermediate frequency (IF) signal stored in memory 775 and perform an FFT function that generates a sequence of chip samples at a baseband rate. Next, chip rate CRISP 500e receives the chip samples from transform CRISP 500d and performs a correlation function that generates a sequence of data symbols. Next, symbol rate CRISP 500f receives the symbol data from chip rate CRISP 500e and performs Viterbi decoding to recover the baseband user data. The baseband user data may then be used by applications subsystem 702.

In one embodiment of the present disclosure, symbol rate CRISP 500f may comprise two or more CRISPs that operate in parallel. Also, by way of example, BMU CRISP 500g may implement such functions as variable length coding, cyclic redundancy check (CRC), convolutional encoding, and the like. Interconnect 725 provides data transfer between RT sequencer 705, memory 710, baseband DSP subsystem 715 and CRISPs 500d-500g.

Applications subsystem 702 comprises real-time (RT) sequencer 730, memory 735, multimedia DSP subsystem 740, interconnect 745, and multimedia macro-CRISP 750. Multimedia macro-CRISP 750 comprises a plurality of special purpose CRISPs, including MPEG-4/H.264 CRISP 550h, transform CRISP 550i, and BMU CRISP 500j. In one embodiment of the present disclosure, MPEG-4/H.264 CRISP 550h performs motion estimation functions and transform CRISP 500h performs a discrete cosine transform (DCT) function. Interconnect 745 provides data transfer between RT sequencer 730, memory 735, multimedia DSP subsystem 740, and multimedia macro-CRISP 750.

In the embodiment shown in FIG. 6, the use of CRISP devices enables applications subsystem 702 of multi-standard SDR system 700 to be reconfigured to support multiple video standards with multiple profiles and sizes. Additionally, the use of CRISP devices enables baseband subsystem 701 of multi-standard SDR system 700 to be reconfigured to support multiple air interface standards. Thus, SDR system 700 is able to operate in different types of wireless networks (e.g., HSDPA, CDMA, GSM, 802.11x, etc.) and can play different types of video and audio formats. However, the use of CRISPs according to the principles of the present disclosure enables SDR system 700 to perform these functions with much lower power consumption than conventional wireless devices having comparable capabilities.

More particularly, the present disclosure provides a reconfigurable correlation unit that may be implemented in a context-based operation reconfigurable instruction set processor. Advantageously, a correlation unit according to the principles of the present disclosure is highly reconfigurable and may be used for different functional blocks operating under different standards, including CDMA de-spreading, IEEE-802.11b CCK demodulation, WCDMA de-spreading, cell search, HSDPA de-spreading, and the like.

Figure 7:
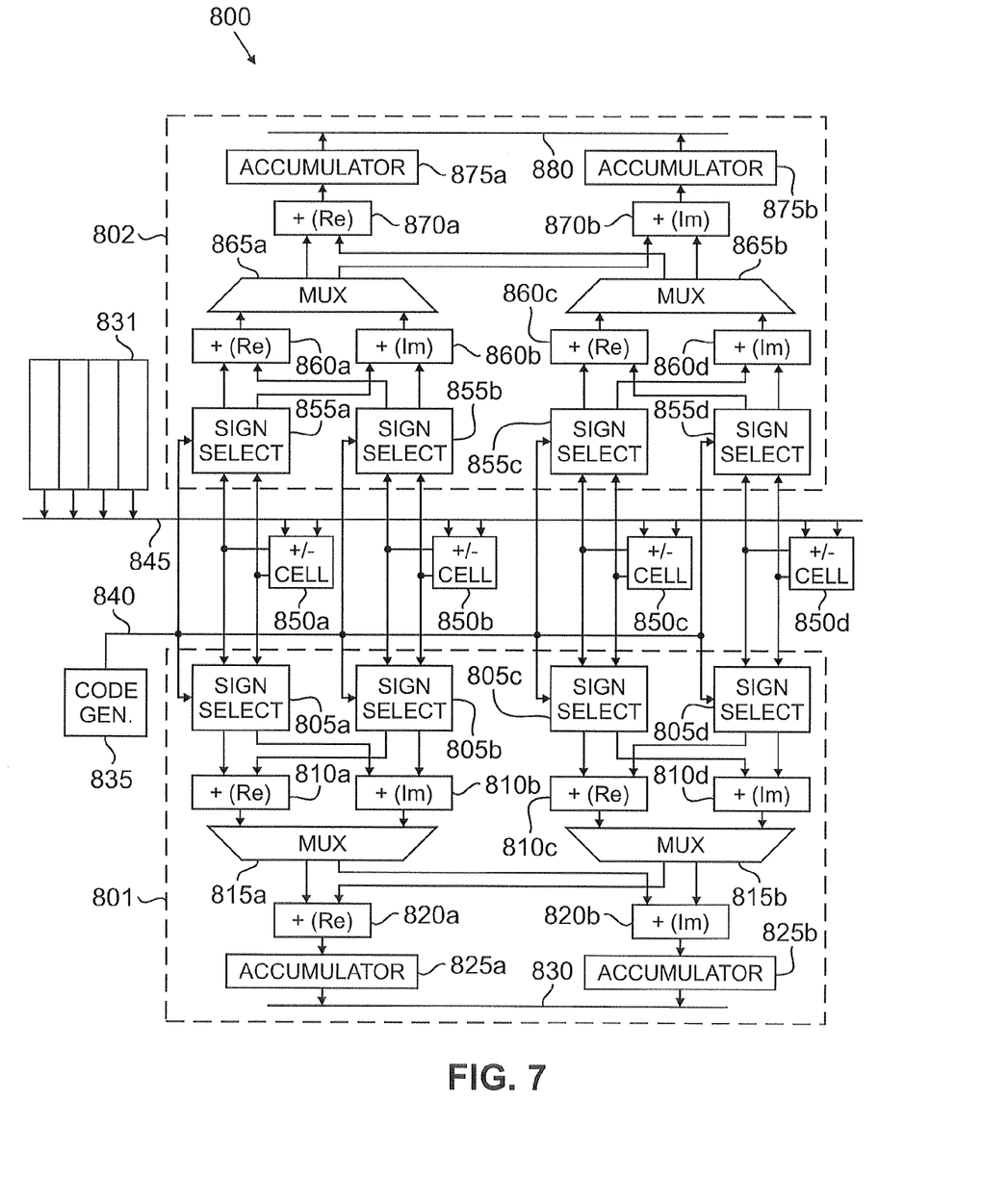
FIG. 7 is a block diagram of a correlation unit according to one embodiment of the disclosure.

FIG. 7 is a block diagram of reconfigurable correlation unit 800 according to one embodiment of the present disclosure. Correlation unit 800 may be implemented as part of chip rate CRISP 500e, for example. Correlation unit 800 comprises three main parts: data memory 831, code generator 835, and a processing unit. In the illustrated embodiment, the processing unit is implemented as two substantially identical processing sub-blocks, namely lower processing unit 801 and upper processing unit 802. Correlation unit 800 further comprises code bus 840, data bus 845, and four add-subtract (±) cells 850a-850d.

Lower processing unit 801 comprises four sign select units 805a-805d, four first stage adders 810a-810d, multiplexers (MUXes) 815a and 815b, two second stage adders 820a and 820b, accumulators 825a and 825b, and output bus 830. Upper processing unit 802 comprises four sign select units 855a-855d, four first stage adders 860a-860d, multiplexers (MUXes) 865a and 865b, two second stage adders 870a and 870b, accumulators 875a and 875b, and output bus 880.

Lower processing unit 801 and upper processing unit 802 operate independently. According to one embodiment of the present disclosure, code bus 840, data bus 845, and output buses 830 and 880 are unidirectional buses. Furthermore, in an advantageous embodiment of the present disclosure, output bus 830 and output bus 880 may be the same bus. For this reason, output bus 830 and output bus 880 will hereafter be referred to only as "output bus 830." Data bus 845 sends the chip sample data from data memory 831 to processing units 801 and 802 via cells 850a-850d. Output bus 830 writes output data from accumulators 825a and 825b and accumulators 875a and 875b to data memory 831. Code bus 840 conveys the code data generated in code generator 835 to processing units 801 and 802.

It should be noted that processing units 801 and 802, memory 831, code generator 835, and buses 830, 840, 845 and 880 may be configured for different standards and functions, including CDMA de-spreading, IEEE-802.11b CCK demodulation, WCDMA de-spreading, cell search, HSDPA de-spreading, and the like. Furthermore, each of the functional components and each of the buses may be shut down independently. The number of cells 850, the width of data memory 831, and the number of sign select units 805 and 855 illustrated and described in FIG. 7 are by way of example only. As will be seen below, the number of processing units 801 and 802 and the sizes of cells 850, data memory 831, and sign select units 805 and 855 may be varied (e.g., increased or decreased) without departing from the scope of the disclosure.

Figure 8:
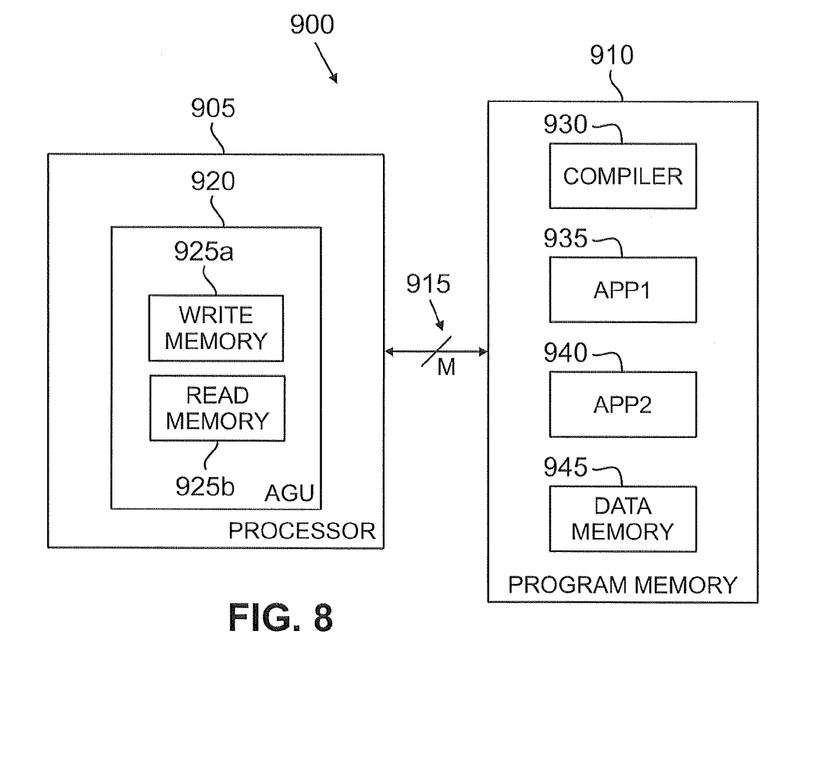
FIG. 8 is a block diagram of a system for generating addresses for a processor according to one embodiment of the disclosure.

FIG. 8 is a block diagram of a system 900 for generating addresses for a processor 905 according to one embodiment of the disclosure. System 900 comprises the processor 905 and a program memory 910, which are coupled to each other by and operable to communicate over an M-bit multi-bus 915. For a particular embodiment, processor 905 may comprise a special-purpose processor such as a CRISP 500. However, it will be understood that processor 905 may comprise any other suitable processor without departing from the scope of this disclosure. For example, processor 905 may comprise an FFT processor, a multi-channel FIR filter, a matrix calculator or the like.

Processor 905 comprises an address generation unit (AGU) 920, which comprises an AGU memory 925 that may be separated into a write memory 925a and a read memory 925b. Alternatively, AGU 920 may be coupled to AGU memory 925. For one embodiment, program memory 910 may comprise a compiler 930, one or more applications 935 and 940, and data memory 945. It will be understood that processor 905 and program memory 910 may comprise other or additional components. Also, the illustrated components may be otherwise suitably implemented. For example, compiler 930 may be implemented separately from program memory 910.

Compiler 930 is operable to compile programs in program memory 910 into executable applications, such as applications 935 and 940. While compiling a program or at any other suitable time, compiler 930 is operable to calculate data addresses for data stored in data memory 945 to be used by the program, along with changes in data addresses. Compiler 930 is also operable to store the calculated data addresses in AGU memory 925. In addition, compiler 930 is operable to set assigned bits in program instructions to indicate when a new data address is to be used for either a write operation or a read operation and to indicate when a current data address is to be incremented for either a write operation or a read operation. As an alternative, any other suitable component(s) may be operable to perform any one or more of these functions. As another alternative, a pointer for AGU memory 925 and/or the contents of AGU memory 925 may be changed by an application, such as application 935 or 940, while the application is being executed.

AGU 920 is operable to generate sets of write and read addresses for use by applications, such as applications 935 and 940, based on an AGU pointer and the addresses stored in AGU memory 925 and based on bits in instructions that are set by compiler 930, as described above. For one embodiment, a single AGU pointer is used for both write and read memories 925a and 925b. However, for an alternative in which a new set of write addresses may be loaded when the set of read addresses is simply incremented, for example, two AGU pointers may be implemented: an AGU write pointer and an AGU read pointer.

Figure 9:
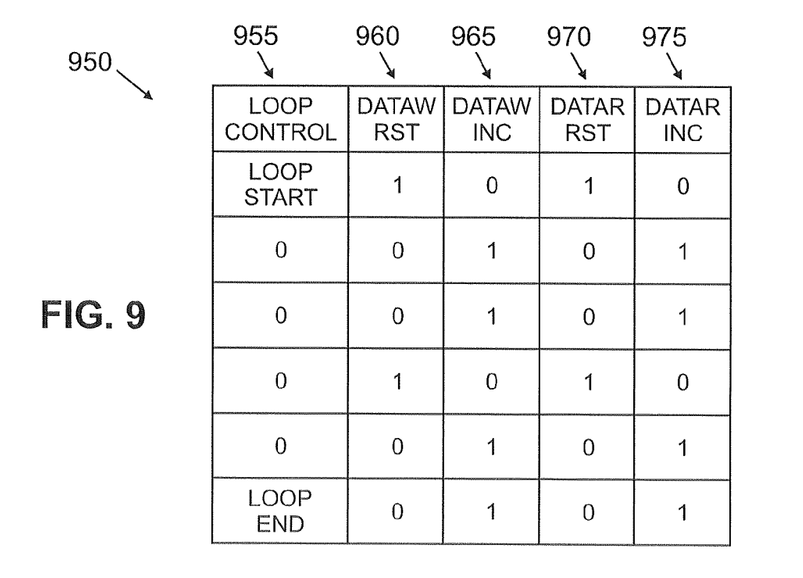
FIG. 9 illustrates an example of an instruction that uses address generation according to one embodiment of the disclosure.

FIG. 9 illustrates an example of an instruction 950 that uses address generation according to one embodiment of the disclosure. For this example, the instruction 950 is a loop instruction, with each line comprising a loop control bit 955, a write data reset bit 960, a write data increment bit 965, a read data reset bit 970 and a read data increment bit 970.

Loop control bit 955 may be used to indicate that the corresponding line of the instruction 950 is the beginning of a loop, the end of a loop, or neither of those. For one embodiment, write data reset bit 960 comprises a 1 to indicate that a new write address (or set of write addresses) is to be loaded from AGU write memory 925a or a 0 to indicate that no new write address is to be loaded. In addition, when a new write or read address is loaded, an AGU pointer for AGU memory 925 is incremented. Write data increment bit 965 comprises a 1 to indicate that the current write address is to be incremented or a 0 to indicate that the current write address is not to be incremented.

Similarly, read data reset bit 970 comprises a 1 to indicate that a new read address (or set of read addresses) is to be loaded from AGU read memory 925b or a 0 to indicate that no new read address is to be loaded. Read data increment bit 975 comprises a 1 to indicate that the current read address is to be incremented or a 0 to indicate that the current read address is not to be incremented.

It will be understood that the instruction 950 may comprise additional bits related to the particular instruction being executed. In addition, it will also be understood that other suitable embodiments of instruction 950 may be implemented. For example, 1s and 0s may be interchanged with regard to what is indicated by the bits 960, 965, 970 and/or 975.

Figure 10A:
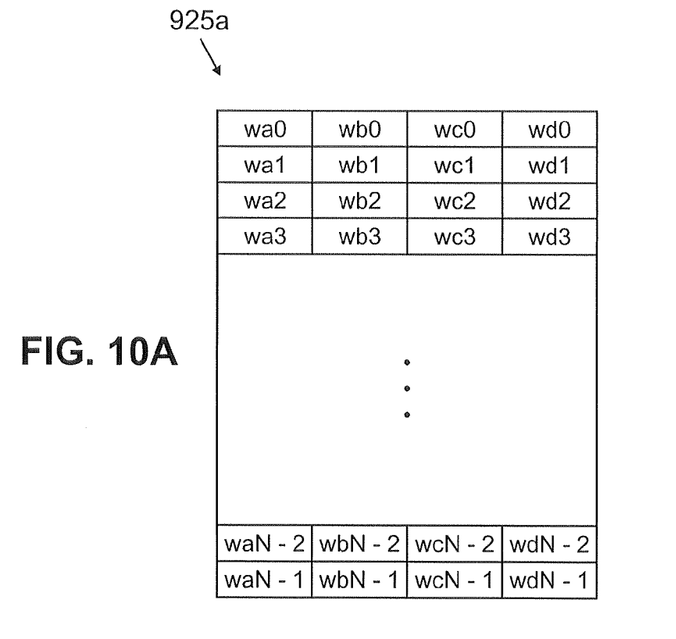
FIGS. 10A-B are block diagrams of examples of the write memory and the read memory, respectively, of the address generation unit of FIG. 8 according to one embodiment of the disclosure.
Figure 10B:
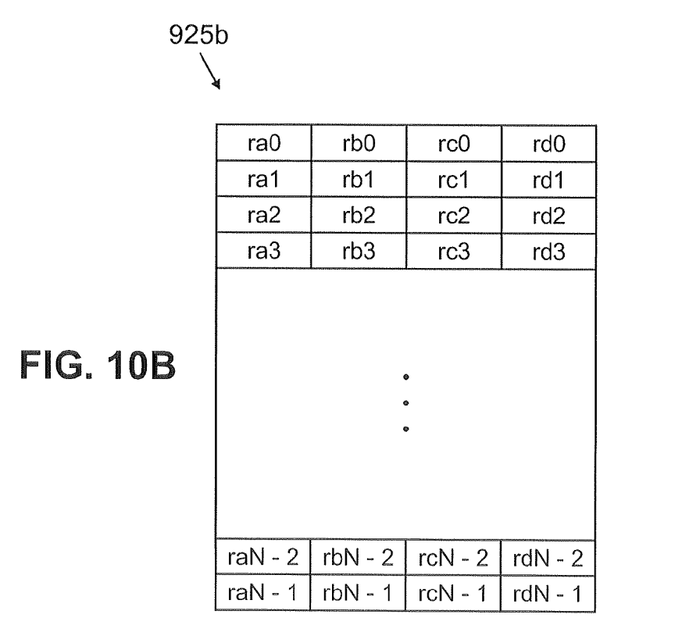
Figure 11:
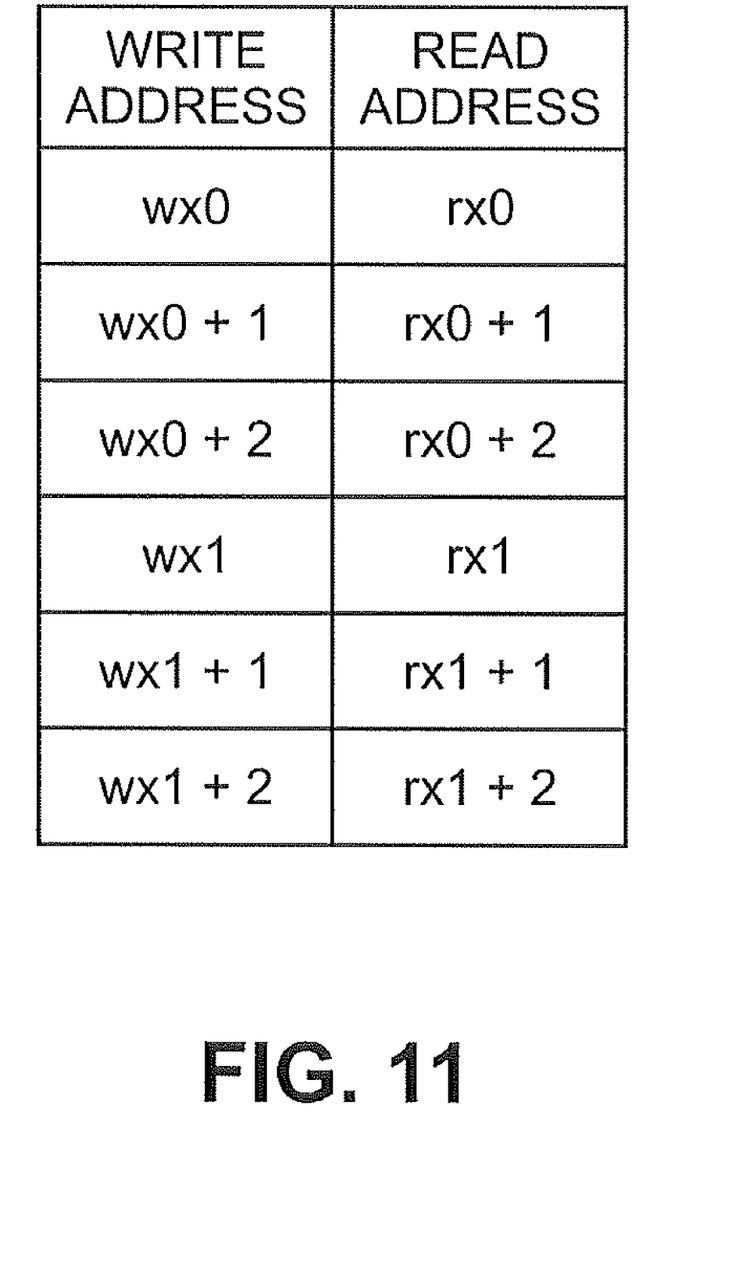
FIG. 11 illustrates the write address and read address for each line of the instruction of FIG. 9 according to one embodiment of the disclosure.

FIGS. 10A-B are block diagrams of examples of write memory 925a and read memory 925b, respectively, according to one embodiment of the disclosure. For this embodiment, each AGU memory 925a and 925b is operable to store up to N sets of addresses. Also, for this embodiment, multi-bus 915 may comprise a four-bit bus and each instruction 950 may result in the loading of up to four different write addresses and up to four different read addresses. FIG. 11 illustrates the write address and read address for each line of the instruction 950 of FIG. 9 based on the example of contents in AGU memories 925a and 925b shown in FIGS. 10A and 10B.

As an example, using the instruction 950, on the first line the loop begins and a new set of write addresses and a new set of read addresses are loaded based on the bits 960 and 970 each comprising a 1. Thus, for the example illustrated in FIGS. 10A and 10B, the write addresses wa0, wb0, wc0 and wd0 and the read addresses ra0, rb0, rc0 and rd0 are loaded for use by an application based on an AGU pointer pointing to the first line of each AGU memory 925a and 925b. This is illustrated in FIG. 11, which shows the addresses for the first line as wx0 and rx0, with x representing a, b, c or d. In addition, the AGU pointer, which had been pointing to the first line in AGU memories 925a and 925b is incremented to point to the second line.

In the second line of the instruction 950, based on the bits 965 and 975 each comprising a 1, the current write addresses and read addresses are incremented. Thus, at this point, the addresses loaded are wx0+1 and rx0+1, as shown in FIG. 11. Similarly, in the third line of the instruction 950, based on the bits 965 and 975 each comprising a 1, the current write addresses and read addresses are again incremented. Thus, at this point, the addresses loaded are wx0+2 and rx0+2, as shown in FIG. 11.

In the fourth line of the instruction 950, the bits 960 and 970 each comprise a 1, resulting in new sets of write and read addresses, respectively, being loaded. Thus, at this point, based on the AGU pointer pointing to the second line in AGU memories 925a and 925b, the write addresses wa1, wb1, wc1 and wd1 and the read addresses ra1, rb1, rc1 and rd1 are loaded for use by the application. This is illustrated in FIG. 11, which shows the addresses for the fourth line as wx1 and rx1. Also, the AGU pointer is again incremented to point to the third line of AGU memories 925a and 925b at this point.

In the fifth line of the instruction 950, based on the bits 965 and 975 each comprising a 1, the current write addresses and read addresses are incremented. Thus, at this point, the addresses loaded are wx1+1 and rx1+1, as shown in FIG. 11. Similarly, in the sixth line of the instruction 950, based on the bits 965 and 975 each comprising a 1, the current write addresses and read addresses are again incremented. Thus, at this point, the addresses loaded are wx1+2 and rx1+2, as shown in FIG. 11. Also, based on the loop control bit 955, the loop ends after this line. When the application resumes, which may or may not include another loop, the next set of addresses to be loaded will correspond to wx2 and rx2 based on the current status of the AGU pointer.

Figure 12:
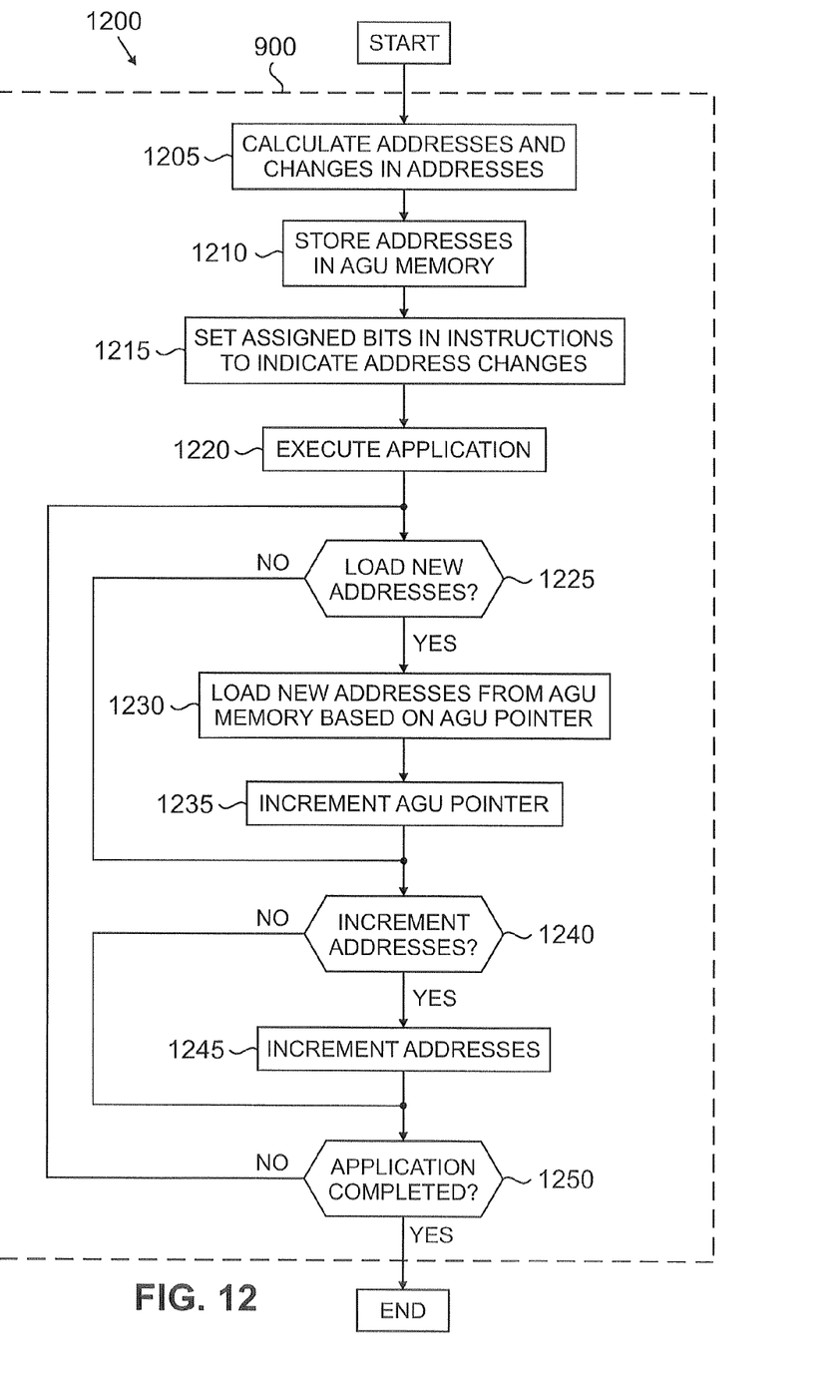
FIG. 12 is a flow diagram illustrating a method for generating addresses using the address generation unit of FIG. 8 according to one embodiment of the disclosure.

FIG. 12 is a flow diagram illustrating a method 1200 for generating addresses using address generation unit (AGU) 920 and compiler 930 according to one embodiment of the disclosure. Initially, compiler 930 calculates data addresses for the data stored in data memory 945 to be used by a program that is being compiled into an application such as application 935, along with changes in data addresses (process step 1205). Compiler 930 then stores these data addresses in AGU memory 925, which may be separated into AGU write memory 925a and AGU read memory 925b (process step 1210).

Compiler 930 sets assigned bits in program instructions, such as instruction 950, to indicate when a new set of data addresses is to be used for either a write operation or a read operation and to indicate when a current set of data addresses is to be incremented for either a write operation or a read operation (process step 1215). For example, compiler 930 may set a write data reset bit 960 and/or a read data reset bit 970 to 1 when the application 935 is to load a new set of write and/or read addresses from AGU memory 925 or to 0 when no new set of addresses is to be loaded. Compiler 930 may also set a write data increment bit 965 and/or a read data increment bit 975 to 1 when the application 935 is to increment the current set of write and/or read addresses or to 0 when the current set of write and/or read addresses is not to be incremented. For a particular embodiment, each set of addresses may comprise four addresses; however, it will be understood that each set of addresses may comprise any suitable number of addresses.

When the application 935 is executed (process step 1220), AGU 920 determines whether to load a new set of write addresses and/or a new set of read addresses based on the write data reset bit 960 and the read data reset bit 970, respectively (process step 1225). If a new set of addresses is to be loaded, the application 935 loads the set of addresses from AGU memory 925 based on the current AGU pointer, which initially points to the first line in AGU memory 925 (process step 1230). The AGU pointer is then incremented to point to the next set of addresses in AGU memory 925 (process step 1235). For the embodiment in which separate AGU pointers are implemented for write and read, if a new set of only write addresses or read addresses is loaded, only the corresponding AGU pointer is incremented.

If no new write or read addresses are to be loaded (process step 1225), AGU 920 determines whether to increment the current set of write addresses and/or read addresses based on the write data increment bit 965 and the read data increment bit 975, respectively (process step 1240). If a set of addresses is to be incremented, AGU 920 increments the current set of addresses (process step 1245).

After incrementing the AGU pointer (process step 1235) and/or current addresses (process step 1245) or after determining that neither of these is to be incremented (process steps 1225 and 1240), AGU 920 determines whether or not the application 935 is completed (process step 1250). If the application 935 is not completed, the method returns to process step 1225, where the application 935 may execute a subsequent line of the instruction and AGU 920 may continue to generate addresses as described above. However, if the application 935 is completed, the method comes to an end. In this way, the instruction set of processor 905 may be significantly simplified and its complexity may be significantly reduced. In addition, the complexity of AGU 920 in processor 905 may be significantly reduced.

Although the present invention has been described with one embodiment, various changes and modifications may be suggested to one skilled in the art. It is intended that the present invention encompass such changes and modifications as fall within the scope of the appended claims.

What is claimed is:

1. A method for generating addresses for a processor, the addresses for use by an application executed by the processor, the application comprising a plurality of instructions, each instruction comprising at least one line, the method comprising:

storing a plurality of predetermined addresses when compiling the application; and for each instruction, generating at least one address for the processor based on the plurality of predetermined addresses, each of the at least one line of each instruction having a number of control bits that are used to determine whether to generate the at least one address by one of loading one of the plurality of predetermined addresses and incrementing at least one last generated address, wherein for at least one of the plurality of instructions, the number of control bits are used to determine whether to increment one of the plurality of predetermined addresses that was last loaded based on the number of control bits.

2. The method as set forth in claim 1, the at least one address comprising at least one set of addresses, the at least one set of addresses comprising at least one of a set of write addresses and a set of read addresses, generating the at least one address for the processor based on the predetermined addresses comprising determining whether to load a new set of addresses from the predetermined addresses based on a data reset bit in each line, the new set of addresses selected from the predetermined addresses.

3. The method as set forth in claim 2, wherein generating the at least one address for the processor based on the predetermined addresses further comprises loading the new set of addresses when the data reset bit comprises a predefined reset value.

4. The method as set forth in claim 3, the predefined reset value comprising a 1.

5. The method as set forth in claim 3, generating the at least one address for the processor based on the predetermined addresses further comprising incrementing a pointer when the new set of addresses is loaded.

6. The method as set forth in claim 3, generating the at least one address for the processor based on the predetermined addresses further comprising determining whether to increment a current set of the at least one set of addresses based on a data increment bit in the line.

7. The method as set forth in claim 6, generating the at least one address for the processor based on the predetermined addresses further comprising incrementing the current set of addresses when the data increment bit comprises a predefined increment value.

8. The method as set forth in claim 7, the predefined increment value comprising a 1.

9. The method as set forth in claim 1, the processor comprising a context-based operation reconfigurable instruction set processor, the at least one address comprising a set of write addresses and a set of read addresses, generating at least one address for the processor based on the predetermined addresses comprising generating a set of four write addresses and a set of four read addresses.

10. The method as set forth in claim 1, further comprising calculating the predetermined addresses while compiling the application.

11. The method as set forth in claim 10, the at least one address comprising at least one set of addresses, the at least one set of addresses comprising a set of write addresses and a set of read addresses, the method further comprising:
    setting at least one bit in each line of each instruction to indicate whether to load a new set of the at least one set of addresses; and
    setting at least one bit in each line of each instruction to indicate whether to increment a current set of addresses.

12. The method as set forth in claim 11,
    setting at least one bit in each line of each instruction to indicate whether to load the new set of addresses comprising setting a write data reset bit to indicate whether to load a new set of write addresses and setting a read data reset bit to indicate whether to load a new set of read addresses, and
    setting at least one bit in each line of each instruction to indicate whether to increment a current set of the at least one set of addresses comprising setting a write data increment bit to indicate whether to increment a current set of write addresses and setting a read data increment bit to indicate whether to increment a current set of read addresses.

13. A system for generating addresses for a processor, the addresses for use by an application executed by the processor, the application comprising a plurality of instructions, each instruction comprising at least one line, the system comprising:
    an address generation unit (AGU) memory configured to store a plurality of predetermined addresses when the application is compiled; and
    an AGU configured, for each instruction, to generate at least one address for the processor based on the plurality of predetermined addresses stored in the AGU memory, each of the at least one line of each instruction having a number of control bits that are used to determine whether to generate the at least one address by one of loading one of the plurality of predetermined address and incrementing at least one last generated address,
    wherein for at least one of the plurality of instructions, the number of control bits are used to determine whether to increment one of the plurality of predetermined addresses that was last loaded based on the number of control bits.

14. The system as set forth in claim 13, the AGU comprising the AGU memory.

15. The system as set forth in claim 13, the AGU coupled to the AGU memory.

16. The system as set forth in claim 13, the at least one address comprising a set of write addresses and a set of read addresses, the AGU configured to generate the at least one address for the processor based on the predetermined addresses by determining whether to load a new set of write addresses from the predetermined addresses in the AGU memory based on a write data reset bit in each line and whether to load a new set of read addresses from the predetermined addresses in the AGU memory based on a read data reset bit in the line.

17. The system as set forth in claim 16, the AGU further configured to generate the at least one address for the processor based on the predetermined addresses by loading the new set of write addresses from the AGU memory when the write data reset bit comprises a predefined reset value and by loading the new set of read addresses from the AGU memory when the read data reset bit comprises the predefined reset value.

18. The system as set forth in claim 17, the AGU further configured to generate the at least one address for the processor based on the predetermined addresses by incrementing a pointer for the AGU memory when a new set of addresses is loaded from the AGU memory.

19. The system as set forth in claim 17, the AGU memory comprising an AGU write memory and an AGU read memory, the AGU further configured to generate the at least one address for the processor based on the predetermined addresses by incrementing a write pointer for the AGU write memory when a new set of write addresses is loaded from the AGU write memory and by incrementing a read pointer for the AGU read memory when a new set of read addresses is loaded from the AGU read memory.

20. The system as set forth in claim 17, the AGU further configured to generate the at least one address for the processor based on the predetermined addresses by determining whether to increment a current set of write addresses based on a write data increment bit in the line and whether to increment a current set of read addresses based on a read data increment bit in the line.

21. The system as set forth in claim 20, the AGU further configured to generate the at least one address for the processor based on the predetermined addresses by incrementing the current set of write addresses when the write data increment bit comprises a predefined increment value and by incrementing the current set of read addresses when the read data increment bit comprises the predefined increment value.

22. The system as set forth in claim 13, further comprising a compiler configured to calculate the predetermined addresses and to store the predetermined addresses in the AGU memory.

23. The system as set forth in claim 22, the at least one address comprising at least one set of addresses, the compiler further configured to set at least one bit in each line of each instruction to indicate whether to load a new set of the at least one set of addresses and to set at least one bit in each line of each instruction to indicate whether to increment a current set of the at least one set of addresses.

24. A system for generating addresses for a processor, the addresses for use by an application executed by the processor, the application comprising a plurality of instructions, each instruction comprising at least one line, the system comprising:
    a program memory comprising an application and a compiler, the compiler configured to calculate a plurality of predetermined addresses for the application when the application is compiled; and a processor coupled to the program memory, the processor comprising an address generation unit (AGU) memory configured to store the plurality of predetermined addresses and an AGU configured, for each instruction, to generate at least one address for the processor based on the plurality of predetermined addresses stored in the AGU memory, each of the at least one line of each instruction having a number of control bits that are used to determine whether to generate the at least one address by one of loading one of the plurality of predetermined addresses and incrementing at least one last generated address, wherein for at least one of the plurality of instructions, the number of control bits are used to determine whether to increment one of the plurality of predetermined addresses that was last loaded based on the number of control bits.

25. The system as set forth in claim 24, the at least one address comprising a set of write addresses and a set of read addresses, the AGU configured to generate the at least one address for the processor based on the predetermined addresses by determining whether to load a new set of write addresses from the predetermined addresses in the AGU memory based on a write data reset bit in each line and whether to load a new set of read addresses from the predetermined addresses in the AGU memory based on a read data reset bit in each line.

26. The system as set forth in claim 25, the AGU further configured to generate the at least one address for the processor based on the predetermined addresses by loading the new set of write addresses from the AGU memory when the write data reset bit comprises a predefined reset value and by loading the new set of read addresses from the AGU memory when the read data reset bit comprises the predefined reset value.

27. The system as set forth in claim 26, the AGU further configured to generate the at least one address for the processor based on the predetermined addresses by incrementing a pointer for the AGU memory when a new set of addresses is loaded from the AGU memory.

28. The system as set forth in claim 26, the AGU memory comprising an AGU write memory and an AGU read memory, the AGU further configured to generate the at least one address for the processor based on the predetermined addresses by incrementing a write pointer for the AGU write memory when a new set of write addresses is loaded from the AGU write memory and by incrementing a read pointer for the AGU read memory when a new set of read addresses is loaded from the AGU read memory.

29. The system as set forth in claim 26, the AGU further configured to generate the at least one address for the processor based on the predetermined addresses by determining whether to increment a current set of write addresses based on a write data increment bit in the line and whether to increment a current set of read addresses based on a read data increment bit in the line.

30. The system as set forth in claim 29, the AGU further configured to generate the at least one address for the processor based on the predetermined addresses by incrementing the current set of write addresses when the write data increment bit comprises a predefined increment value and by incrementing the current set of read addresses when the read data increment bit comprises the predefined increment value.

31. The system as set forth in claim 24, the at least one address comprising at least one set of addresses, the compiler further configured to set at least one bit in each line of each instruction to indicate whether to load a new set of the at least one set of addresses and to set at least one bit in each line of each instruction to indicate whether to increment a current at least one set of addresses.

32. The system as set forth in claim 24, the processor comprising a context-based operation reconfigurable instruction set processor.

* * * * *